US011254507B2

(12) United States Patent
Castronuovo et al.

(10) Patent No.: US 11,254,507 B2
(45) Date of Patent: Feb. 22, 2022

(54) CONVEYOR

(71) Applicant: BRILLIANT STAGES LIMITED, Pontefract (GB)

(72) Inventors: Giorgio Castronuovo, Pontefract (GB); James Kempf, Pontefract (GB)

(73) Assignee: Brilliant Stages Limited, Ponte Fract (GB)

( * ) Notice: Subject to any disclaimer, the term of this patent is extended or adjusted under 35 U.S.C. 154(b) by 0 days.

(21) Appl. No.: 17/050,944

(22) PCT Filed: Apr. 25, 2019

(86) PCT No.: PCT/GB2019/051159
§ 371 (c)(1),
(2) Date: Oct. 27, 2020

(87) PCT Pub. No.: WO2019/207311
PCT Pub. Date: Oct. 31, 2019

(65) Prior Publication Data
US 2021/0229922 A1     Jul. 29, 2021

(30) Foreign Application Priority Data

Apr. 27, 2018 (GB) .................................. 1806932

(51) Int. Cl.
*B65G 15/28* (2006.01)
*B65G 21/06* (2006.01)
(Continued)

(52) U.S. Cl.
CPC ............. *B65G 15/28* (2013.01); *B65G 15/24* (2013.01); *B65G 15/62* (2013.01); *B65G 21/06* (2013.01);
(Continued)

(58) Field of Classification Search
CPC ........ B65G 15/28; B65G 15/62; B65G 15/22; B65G 15/24; B65G 2207/30; B65G 21/06; B65G 23/10; B65G 23/44; B65G 21/12
See application file for complete search history.

(56) References Cited

U.S. PATENT DOCUMENTS

| 8,469,182 B2 * | 6/2013 | Alotto | B65G 23/44 |
| | | | 198/813 |
| 2003/0132064 A1 * | 7/2003 | McQuaid | B65G 21/06 |
| | | | 186/68 |

(Continued)

FOREIGN PATENT DOCUMENTS

| CN | 203879055 U | 10/2014 |
| JP | H09305828 A | 11/1997 |

(Continued)

OTHER PUBLICATIONS

International Search Report and Written Opinion for Application No. PCT/GB2019/051159 dated Jul. 16, 2019 (16 pages).
United Kingdom Patent Office Search Report for Application No. 1806932.8 dated Oct. 29, 2018 (3 pages).

*Primary Examiner* — Mark A Deuble
(74) *Attorney, Agent, or Firm* — Saxton & Stump LLC

(57) ABSTRACT

An end unit (100) for a conveyor (1000) for use in a stage assembly comprises a first frame (110) installable in the stage assembly and a second frame (120). The second frame (120) comprises a rotatable body (130) for supporting a conveyor belt (300), and is arranged to pivot with respect to the first frame (110), so as to open in a direction transverse to a direction of motion of the conveyor belt (300). An intermediate unit (200) for a conveyor (1000) for use in a stage assembly is configured to be disposed between a pair of end units (100), and comprises a first frame (210) installable in the stage assembly and a second frame (220) comprising a support surface (223) for supporting a con- (Continued)

veyor belt (300). The second frame (220) is pivotally attached to the first frame (210), so as to open in a direction transverse to a direction of motion of the conveyor belt (300). A conveyor (1000) comprises a pair of end units (100), and optionally one or more of the intermediate units (200).

20 Claims, 7 Drawing Sheets

(51) Int. Cl.
 *B65G 23/44* (2006.01)
 *E04H 3/28* (2006.01)
 *B65G 15/24* (2006.01)
 *B65G 15/62* (2006.01)
 *B65G 23/10* (2006.01)
(52) U.S. Cl.
 CPC ............ *B65G 23/10* (2013.01); *B65G 23/44* (2013.01); *E04H 3/28* (2013.01); *B65G 2207/30* (2013.01)

(56) References Cited

U.S. PATENT DOCUMENTS

| | | | | |
|---|---|---|---|---|
| 2007/0187211 | A1* | 8/2007 | Vertogen | B65G 47/31 198/461.1 |
| 2008/0073185 | A1* | 3/2008 | Brayman | B65G 15/00 198/860.2 |
| 2013/0062167 | A1* | 3/2013 | Alotto | B65G 21/06 198/813 |
| 2013/0264176 | A1* | 10/2013 | Knas | B65G 23/44 198/835 |
| 2019/0127154 | A1* | 5/2019 | Jung-Sassmannshausen | B65G 21/10 |
| 2019/0359428 | A1* | 11/2019 | Specht | B65G 15/22 |
| 2020/0198896 | A1* | 6/2020 | Treise | B65G 15/64 |

FOREIGN PATENT DOCUMENTS

| | | |
|---|---|---|
| JP | 2001163427 A | 6/2001 |
| JP | 2003276819 A | 10/2003 |

* cited by examiner

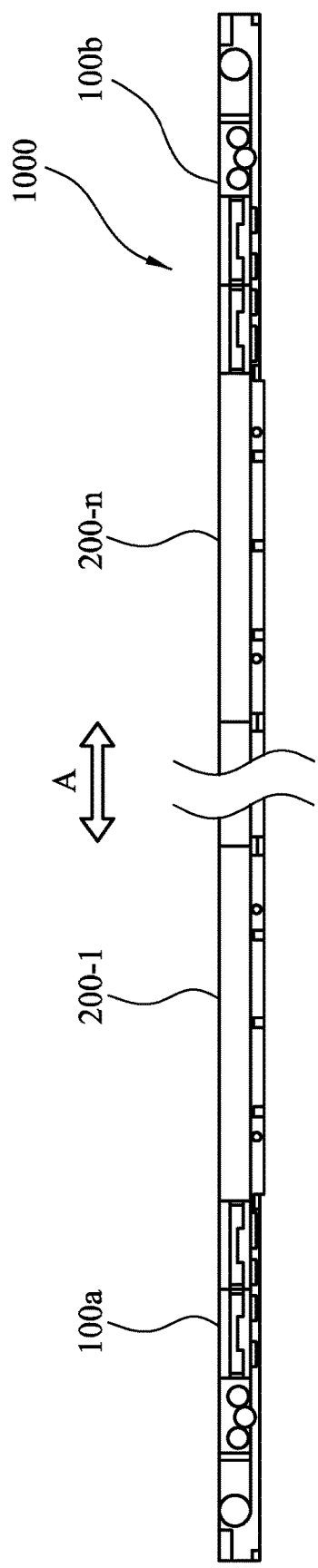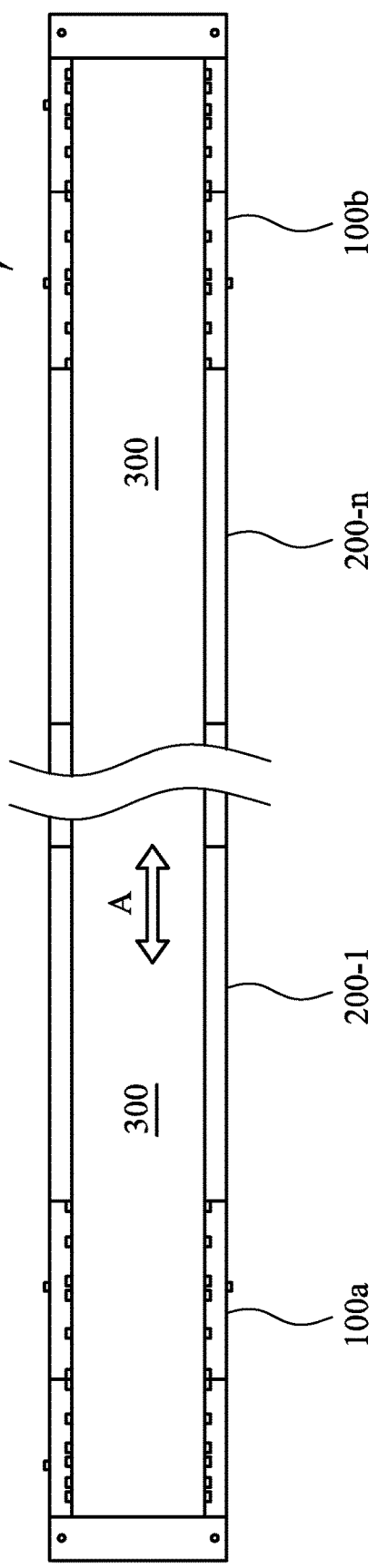
FIG. 1A
FIG. 1B

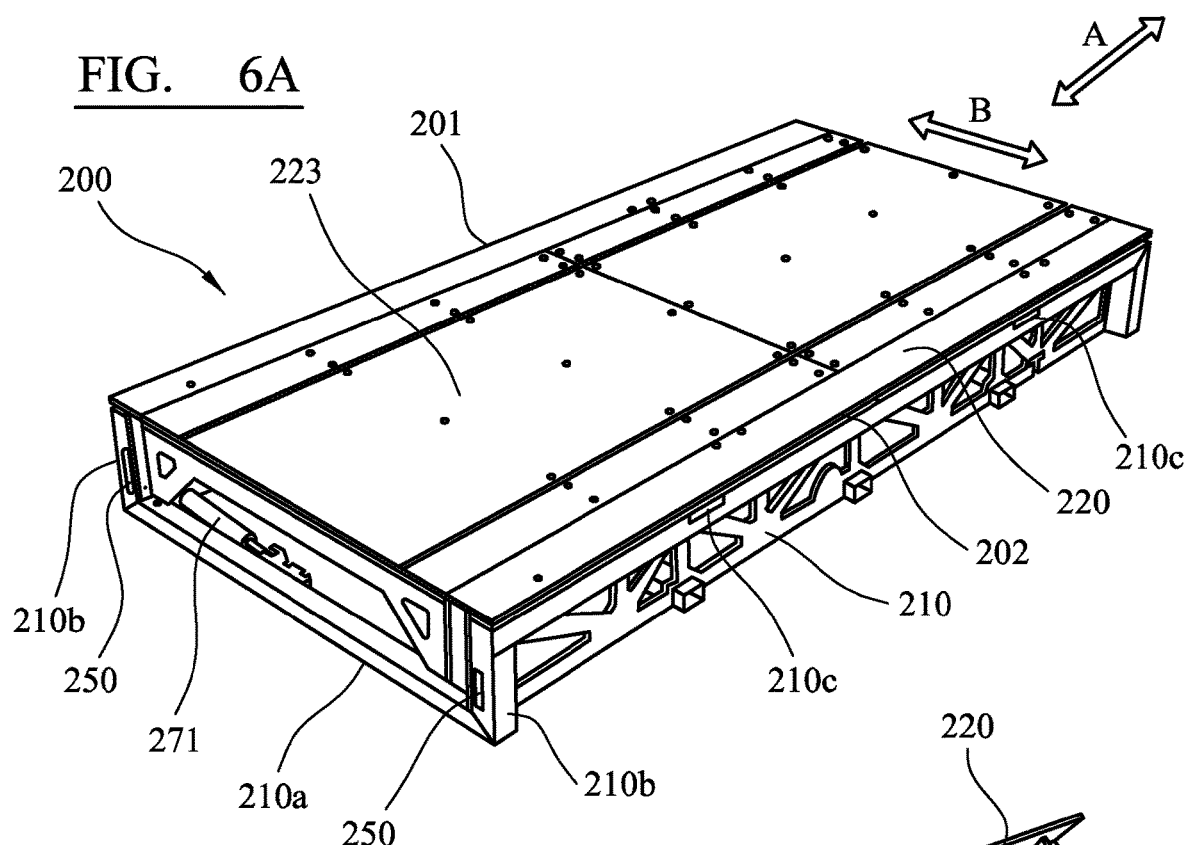

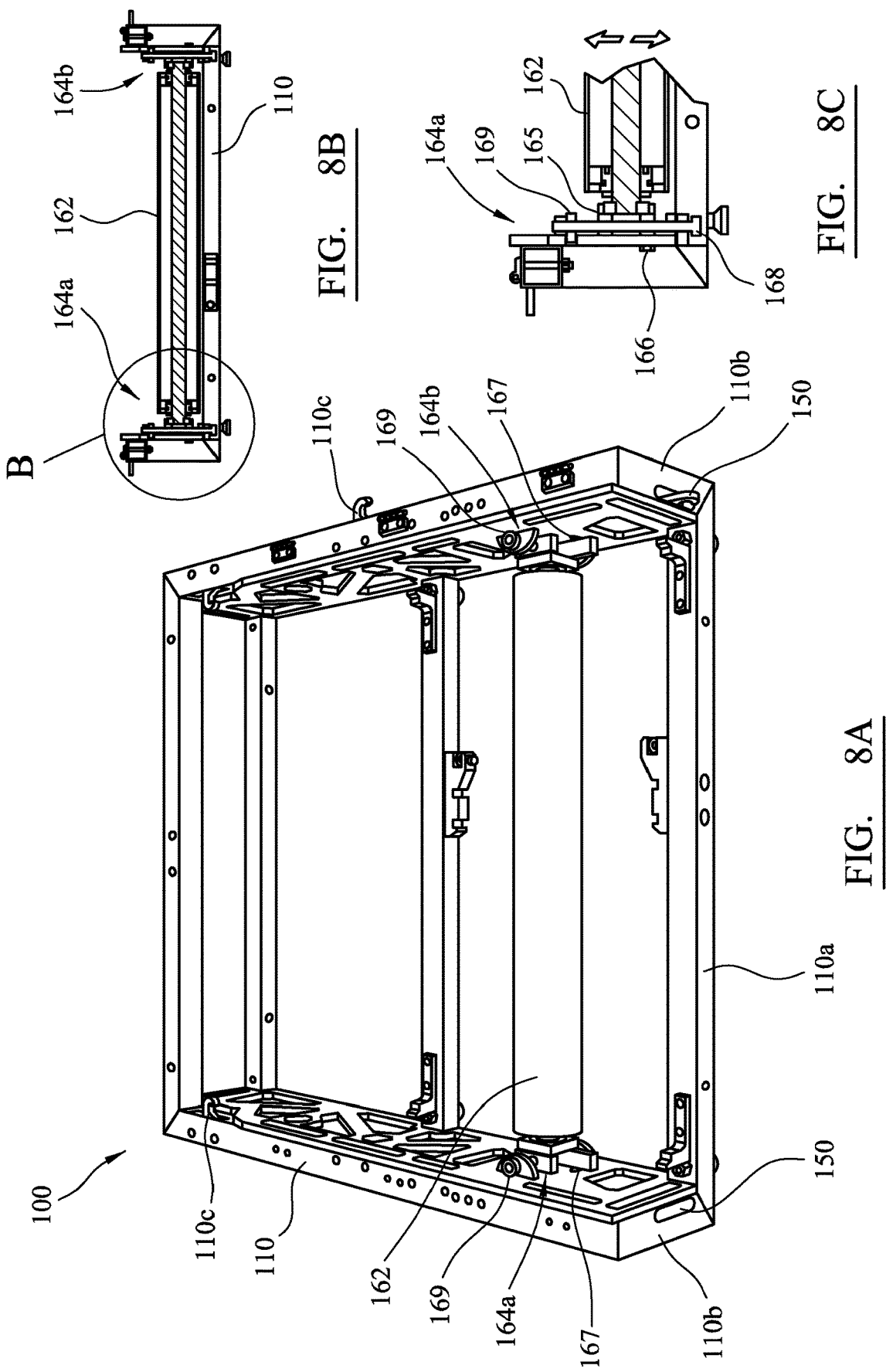

CONVEYOR

FIELD

The present invention relates to a conveyor for use in a stage assembly. Particularly, the present invention relates to an end unit for a conveyor, an intermediate unit for a conveyor and a conveyor and kit of parts comprising the end unit and/or intermediate unit.

BACKGROUND

As well as complex lighting design and sound design, the modern touring music industry employs highly complex staging and set design in order to deliver engaging and entertaining shows, concerts or gigs. The staging may involve complex moving parts, for example in order to convey artists, musical equipment, lighting equipment or other stage equipment during the course of the performance.

It is common for even the most complex shows to be repeated in consecutive nights in different venues. Accordingly, there is a need for these complex staging systems to be rapidly assembled before the show, rapidly dissembled after the show and suitable for packing down in a compact manner for transport between venues, by road, air or boat.

In addition, even for large shows it is typical for a small number of staff to travel with the show to oversee the assembly, disassembly and packing down of the staging, with the bulk of the labour being carried out by locally-hired staff. The locally-hired staff are unlikely to be familiar with the specific staging set-up of the particular show and will have a very limited window of time to become familiar with the way in which the staging is to be assembled. This can be exacerbated in international touring, where the locally-hired staff may not speak the same language as the touring staff.

Accordingly, there is a need to provide stage equipment that supports the complex set design demanded by stage designers and artists, whilst being easy to assemble, dissemble and pack down.

Conveyors are used on stage to transport performers, for example as part of a dance routine. The conveyor will typically comprise a frame having a pair of rollers, with a conveyor belt attachable to the rollers. At least one of the rollers is arranged to drive the belt, typically on receipt of a signal from a remote automation system. Such conveyors are sometimes referred to as "treadmills" in the art, on account of their likeness to the gym equipment.

Various difficulties arise in respect of the installation of such conveyors as part of a stage assembly. Firstly, the belt is typically stored and transported separately to the frame comprising the rollers. In order to fit the belt to the frame, the frame must be partially disassembled to access the rollers. This is time consuming and frustrating work, and for large conveyors that cannot be easily moved once set up it must also be carried out before the conveyor is attached to the stage assembly. Accordingly, the conveyors must often be assembled and located first, before the remainder of the stage is constructed around them.

In addition, it is necessary to adjust the tension of the belt (e.g. by adjusting the position of the rollers in the frame) in order to provide proper operation of the conveyor. Such adjustments also require the partial disassembly of the frame, meaning that, adjusting the tension of a conveyor in situ may involve partial disassembly of the stage. In addition, this may create potential gaps of unknown dimensions in the walking surface of the stage given by the movement of the rollers which need to be filled or dealt with. These gaps could be of different dimensions due for example to the climatic circumstances and consequent different amount of stretch of the belt.

In addition, the conveyors are often provided in fixed, pre-determined lengths, which makes the transport of large conveyors difficult and limits the freedom of the stage designer.

It is an object of the invention to provide a conveyor that overcomes at least some of the above-mentioned disadvantages, and any other disadvantages that may be apparent to the skilled reader from the description herein and/or their knowledge of traditional conveyors. It is a further object of the invention to provide a compact, lightweight conveyor for use as part of a stage assembly, which is easy to install and adjust.

SUMMARY

According to the present invention there is provided an apparatus and method as set forth in the appended claims. Other features of the invention will be apparent from the dependent claims, and the description which follows.

According to a first aspect of the invention there is provided an end unit for a conveyor for use in a stage assembly, the end unit comprising:

a first frame installable in the stage assembly; and a second frame comprising a rotatable body for supporting a conveyor belt;

wherein the second frame is arranged to pivot with respect to the first frame, so as to open in a direction transverse to a direction of motion of the conveyor belt.

When used herein, the term "stage assembly" refers to a collection of components arranged to form a stage or other performance space, for use in a performance or event such as a concert, gig, corporate conference or other show. The components may comprise staging, platforms, decks, lighting, musical equipment and the like.

The rotatable body may be a driving rotatable body, arranged to drive the belt. The end unit may comprise a motor, arranged to drive the driving rotatable body. The motor may be configured to drive the driving rotatable body in response to a signal received from an automation control system. The rotatable body may be configured to be rotated in a forwards direction and a backwards direction. The rotatable body may be coated with or comprise a high-friction material. The high-friction material may comprise vulcanised rubber lagging.

The end unit may comprise a biasing mechanism configured to bias the first frame and second frame to an open configuration. The open configuration may be a partially opened configuration. The end unit may comprise a retaining unit configured to retain the second frame at a position it is moved to by a user. The biasing mechanism may comprise the retaining unit. The biasing mechanism may be configured to bias the second frame to the partially opened configuration and to retain the second frame at a position it is moved to by a user between the partially opened configuration and a fully opened configuration.

The second frame may comprise a support surface for supporting the conveyor belt. The support surface may be substantially aligned with a top of the rotatable body. The support surface may comprise or be coated with a low-friction material. The low friction material may comprise ultra-high-molecular-weight polyethylene.

The end unit may comprise a tensioning unit configured to increase the tension on the conveyor belt when the second frame is in a closed configuration and release the tension on the conveyor belt when the second frame is in an open configuration. The tensioning unit may comprise a first tensioning rotatable body disposed in the first frame and a second tensioning rotatable body disposed in the second frame. The first and second tensioning rotatable bodies may be arranged to contact opposing sides of the conveyor belt. The position of first and/or second tensioning rotatable bodies may be adjustable, preferably vertically, so as to adjust the tension applied to the conveyor belt. One of the first and second frames may comprise a third tensioning rotatable body.

An end of the end unit may comprise a fastener arranged to secure the end unit to another end unit or an intermediate unit as defined in the second aspect.

The end unit may comprise a detachable extension piece, the extension piece being of equal length as the remainder of the end unit in the direction of motion of the conveyor belt.

According to a second aspect of the invention there is provided an intermediate unit for a conveyor for use in a stage assembly, the intermediate unit being configured to be disposed between a pair of end units as defined in the first aspect, the intermediate unit comprising:

a first frame installable in the stage assembly; and a second frame comprising a support surface for supporting a conveyor belt;

wherein the second frame is pivotally attached to the first frame, so as to open in a direction transverse to a direction of motion of the conveyor belt.

The intermediate unit may comprise a biasing mechanism configured to bias the first frame and second frame to an open configuration. The open configuration may be a partially opened configuration. The intermediate unit may comprise a retaining unit configured to retain the second frame at a position it is moved to by a user. The biasing mechanism may comprise the retaining unit. The biasing mechanism may be configured to bias the second frame to the partially opened configuration and to retain the second frame at a position it is moved to by a user between the partially opened configuration and a fully opened configuration.

The support surface may comprise or be coated with a low-friction material. The low friction material may comprise ultra-high-molecular-weight polyethylene.

An end, preferably both ends, of the intermediate unit may comprise a fastener arranged to secure the intermediate unit to another intermediate unit or a end unit as defined in the second aspect.

According to a third aspect of the invention there is provided a conveyor comprising a pair of end units as defined in the first aspect.

The conveyor may comprise one or more intermediate units as defined in the second aspect, disposed between the pair of end units. The conveyor may comprise a conveyor belt.

Only one of the end units may comprise a driving rotatable body. Alternatively, both end units may comprise a driving rotatable body.

Only one of the end units may comprise a tensioning unit. Alternatively, both end units may comprise a tensioning unit.

Further preferred features of the components required in the conveyor of the third aspect are defined hereinabove in relation to the first and second aspects and may be combined in any combination.

According to a fourth aspect of the invention there is provided a kit of parts comprising an end unit as defined in the first aspect. The kit of parts may comprise at least one intermediate unit. The kit of parts may comprise a conveyor belt.

Further preferred features of the components required in the kit of parts of the fourth aspect are defined hereinabove in relation to the first, second and third aspects and may be combined in any combination.

According to a fifth aspect of the invention there is provided a method of assembling a conveyor, comprising:

installing first frames of a pair of end units as defined in the first aspect, and optionally one or more intermediate units as defined in the second aspect, in a stage assembly;

pivoting second frames of the end units, and optionally the intermediate units, so as to open the second frames in a direction transverse to a direction of a motion of a conveyor belt;

attaching the conveyor belt to the second frames; and closing the second frames.

Further preferred features of the components required in the method of the fifth aspect are defined hereinabove in relation to the first to fourth aspects and may be combined in any combination.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1A is a cross-sectional side view of an exemplary conveyor;

FIG. 1B is a plan view of the conveyor of FIG. 1A;

FIG. 6A is a perspective view of an exemplary intermediate unit fora conveyor;

FIG. 6B is a perspective view of the intermediate unit of FIG. 6A in an open configuration;

FIG. 8A is a perspective view of a first frame of the end unit of FIGS. 1-5, showing an exemplary adjustment assembly;

FIG. 8B is a cross-section view along the axis of adjustable roller 162 of FIG. 8A, FIG. 8C is an enlarged view of the area B indicated in FIG. 8B.

Figure 2A:
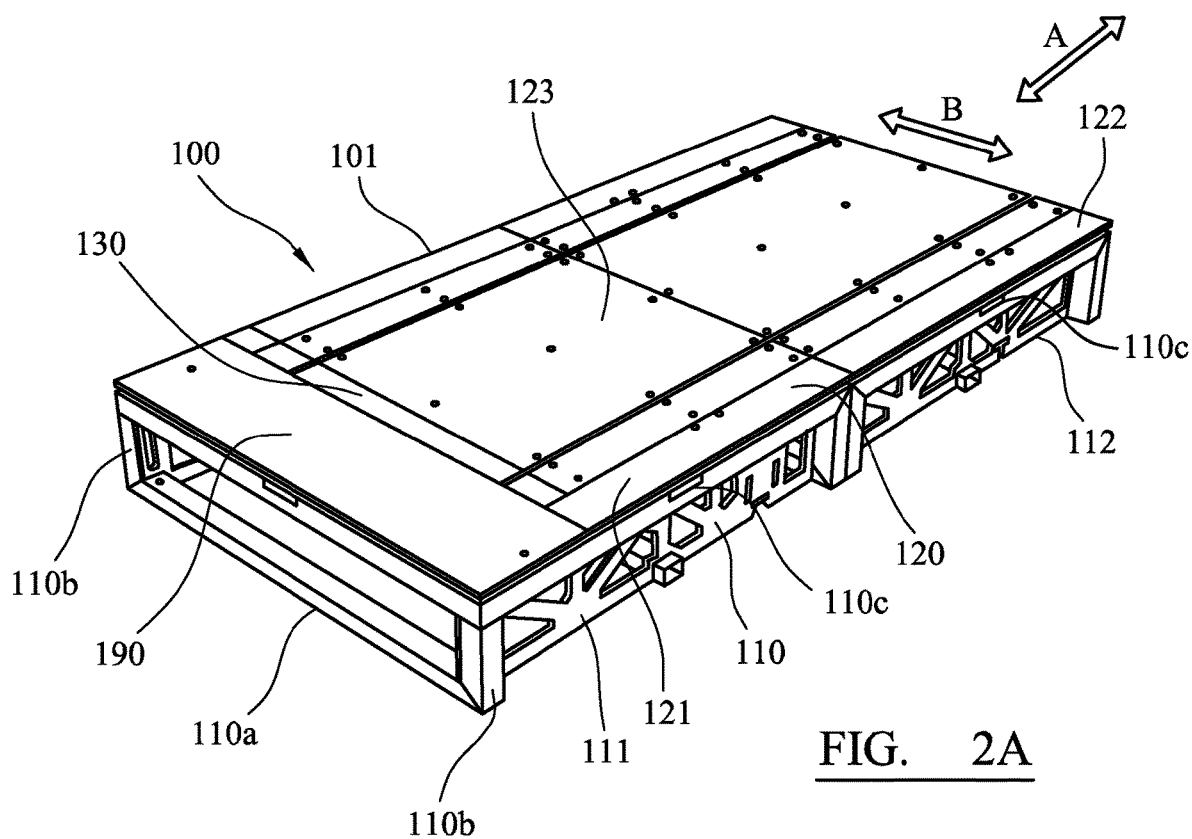
FIG. 2A is a perspective view of an exemplary end unit for a conveyor.
Figure 2B:
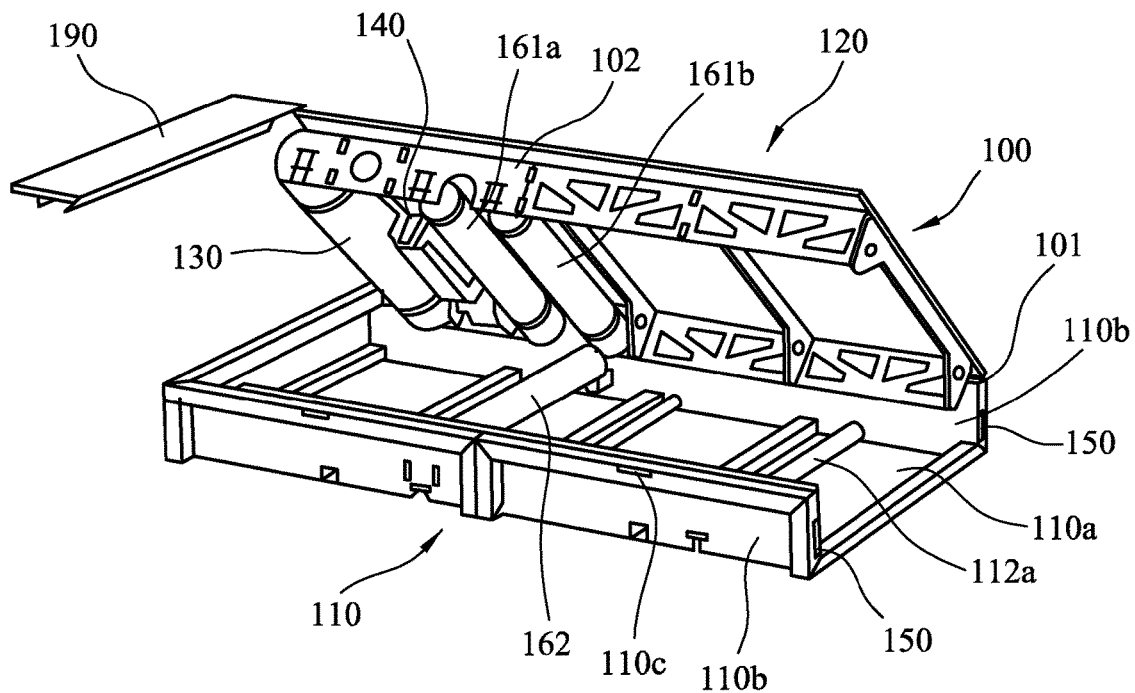
FIG. 2B is a perspective view of the end unit of FIG. 2A in an open configuration.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DESCRIPTION OF EMBODIMENTS

In overview, examples of the invention provide a conveyor suitable for conveying one or more performers and/or props during a performance. The conveyor comprises a pair of end units and optionally one or more intermediate units, each having a first frame installable in a stage assembly and a second frame that is arranged to pivot with respect to the first frame, so as to open in a direction transverse to a direction of motion of a conveyor belt. Accordingly, the conveyor belt can be readily attached to the conveyor in situ. In certain examples, the end units comprise a tensioning mechanism that is activated by the closing of the second frame with respect to the first frame.

FIGS. 1A-B show an exemplary conveyor 1000. The conveyor 1000 comprises a pair of end units 100a and 100b, which form the respective ends of the conveyor 1000. The conveyor also comprises a plurality of intermediate units 200-1 to 200-n, disposed between the end units 100.

The end units 100 and intermediate units 200 are configured to be secured to a neighbouring end units or intermediate units, so as to form the conveyor 1000. Accordingly, each of the end units 100 and intermediate units 200 may comprise a securing means, such as fasteners for fixing the units with respect to one another.

The end units 100 and intermediate units 200 are configured to be secured to a neighbouring staging system (i.e. a stage assembly), so as to form the conveyor 1000 built into a staging system. Accordingly, each of the end units 100 and intermediate units 200 may comprise a securing means, such as fasteners 110c/210c for fixing the units to a staging system.

It will be appreciated that only the intermediate units 200-1 and 200-n, which are respectively most proximate to end units 100a and 100b are shown in these figures, for the sake of clarity. Any number of intermediate units 200, including only a single intermediate unit 200, may be disposed between the end units 100 to give a conveyor 1000 of desired length. In one example, the intermediate units 200 are omitted, with the end units 100a and 100b secured to one another, so as to form a relatively short conveyor 1000.

The conveyor 1000 supports an conveyor belt 300, which is driven by one or both of the end units 100, for example in response to a control signal received from a suitable automation control system, such as an automation control console. Accordingly, a performer may stand on the belt 300 during a performance, with motion of the belt 300 in the direction A causing conveyance of the performer. In one example, the conveyor belt 300 is an endless conveyor belt. In further examples, the conveyor belt 300 comprises a split belt that is clipped together (i.e. a long rectangular sheet, wherein short edges of the rectangle are clipped together to form a conveyor belt).

FIGS. 2A-B and 3A-C show an exemplary end unit 100 in more detail. The end unit 100 comprises a first frame 110 and a second frame 120. The first frame 110 is arranged to be installed in a stage assembly, by connecting the frame 110 to the stage assembly via fasteners 110c, which may take the form of coffin locks. As can be best seen in FIG. 2B, the second frame 120 is hingedly connected to the first frame 110 along one side edge thereof. In particular, the frames 110, 120 are hinged along one of the sides 101 that is parallel to the direction of motion A of the belt 300, so that the second frame 120 opens in a direction B transverse to (i.e. perpendicular to) the direction of motion A of the belt 300. This in turn exposes the opposing side 102 of the second frame 120, in order to assist fitting of the belt 300.

In one example, the first frame 110 is substantially u-shaped in cross-section, having a bottom 110a and opposing sidewalls 110b. Accordingly, the first frame 100 forms a substantially rectangular enclosure, with the second frame 120 acting as an opening/closing lid of the enclosure. As can be best seen in FIG. 3, the sidewalls 110b each comprise a fastener 150, for securing the end unit 100 to a neighbouring unit. Particularly, the fasteners 150 take the form of coffin locks.

References herein to coffin locks will be understood by those skilled in the art to be references to fasteners comprising a male part disposed on one body and a female part disposed on another body. The male part comprises a rotatable hook, which is arranged to be rotated from a retracted position to a deployed position, wherein it hooks around a pin of the female part. It will be further understood that, in other examples, the coffin locks may be replaced with other mechanical fastening means.

In one example, a male coffin lock part 150 is disposed on one sidewall 100b, and a female coffin lock part 150 is disposed on the other sidewall 100b.

The opening and closing of the second frame 120 with respect to the first frame 110 will now be described with reference to FIGS. 3A-C.

Figure 3A:
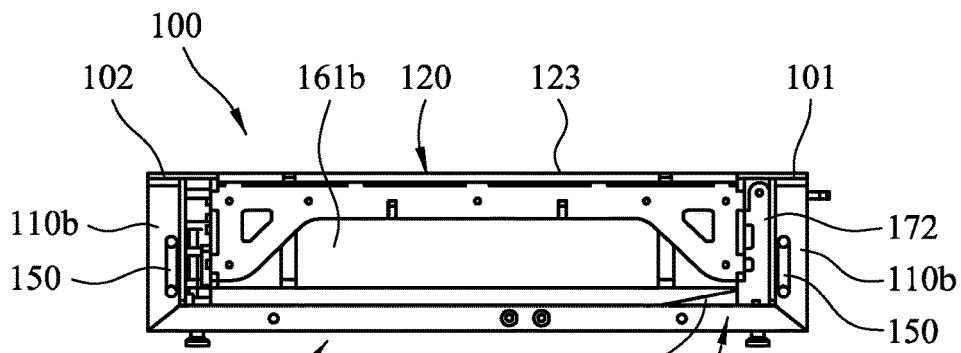
FIGS. 3A-C are side views of the end unit of FIG. 2, respectively in a closed, partially open and fully open configuration.

FIG. 3A shows the second frame 120 in a fully closed configuration, with side 102 thereof in contact with the sidewall 110b opposing the side 101 at which the hinge is formed. The side 102 is secured to the sidewall 110b by virtue of a latching mechanism 180, such as a coffin lock.

Figure 3B:
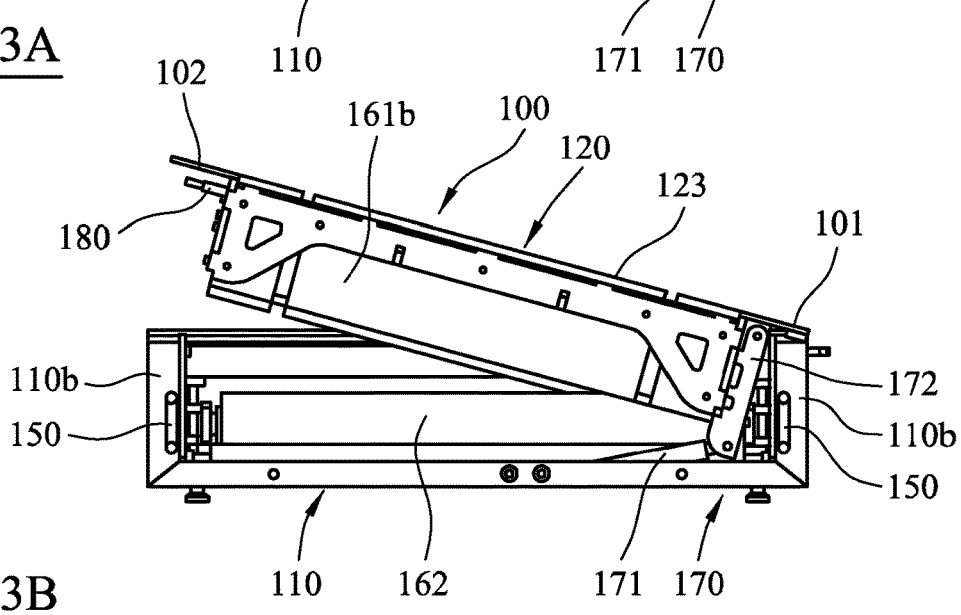
Figure 3C:
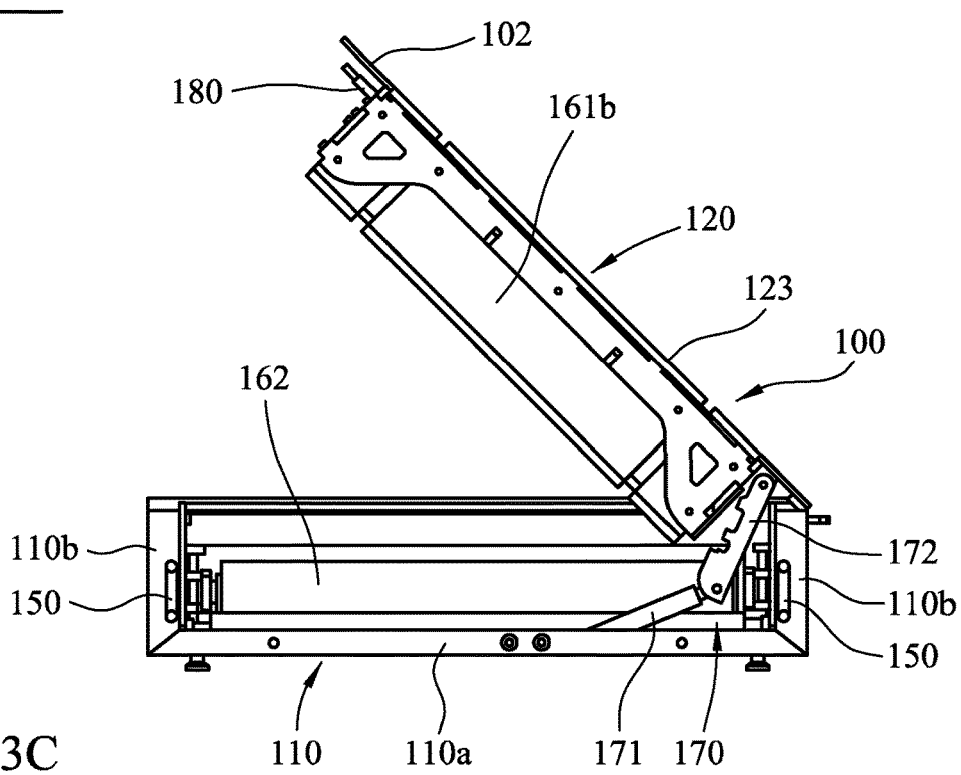

FIG. 3B shows the second frame 120 in a partially opened configuration and FIG. 3C shows the second frame 120 in a fully opened configuration. The latching mechanism 180 has been disengaged to allow the side 102 to disengage from the sidewall 110b. As can be best seen in FIGS. 3B and 3C, the end unit 100 comprises a biasing mechanism 170, arranged to cause the second frame 120 to move apart from the first frame 110.

In detail, the biasing mechanism 170 comprises an extendible member 171 (e.g. a hydraulic cylinder or gas spring/strut) and an arm 172. A first end of the extendible member 171 is pivotally attached to the first frame 110, and a first end of the arm 172 is pivotally attached to the second frame 120. Second ends of the extendible member 171 and the arm 172 are pivotally coupled to each other.

When the second frame 120 is in the fully closed configuration, the extendible member 171 is in a fully extended configuration, and accordingly the extendible member 171 and arm 172 are generally arranged orthogonally to one another, with the extendible member 171 substantially parallel to, or forms a relatively acute angle with, the bottom 110a of frame 110 and the arm 172 substantially parallel to sidewall 110b. However, as the extendible member 171 retracts, the angle formed between arm 172 and member 171 becomes obtuse, so that the arm 172 and member 171 move to a position in which they extend generally diagonally between the first frame 110 and second frame 120, thus bracing the two frames apart.

It will be understood that the "fully extended configuration" of the extendible member is a configuration in which the extendible member is at its maximum possible extension when installed in the end unit 100. It is of course possible that the extendible member 171 may be capable of further extension if not installed in the end unit 100.

In one example, the extendible member 171 is biased to the partially opened configuration. Accordingly, disengagement of the latching mechanism 180 causes the second frame 120 to move automatically to the partially opened configuration. Additionally or alternatively, the extendible member 171 may be configured to retain the second frame 120 in a position it is pushed to by the user. In other words, the biasing force of the extendible member 171 is sufficient to resist the force of gravity. In one example, the extendible member 171 is biased to the partially opened configuration and then configured to be retained in a position it is pushed to between the partially opened configuration and the fully opened configuration.

In some examples, biasing mechanism 170 comprises a plurality of extendible members 171 and corresponding arms 172 disposed along the length of the end unit 100.

Returning to FIG. 2, the upper surface 123 of the second frame 120 acts as a support surface for the conveyor belt 300. In one example, the upper surface 123 is has a low-friction coating or is formed from a low-friction material, to support the belt 300 without interfering with the motion thereof. In one example, the upper surface 123 comprises ultra-high-molecular-weight polyethylene (UHMWPE). The upper surface 123 is substantially aligned with the top of the driving roller 130 (described below), so as to support the belt 300 as it leaves the roller 130.

The end unit 100 is a powered end unit, and so further comprises a driving unit for driving the belt 300. In particular, the end unit 100 comprises a driving roller 130 rotatably mounted to the second frame 120, which is driven by a motor 140, best seen in FIG. 2B. In one example, the motor 140 is also mounted to the second frame 120.

The driving roller 130 is a substantially cylindrical body configured to contact the inner surface of the belt 300 (i.e. the side that contacts the upper surface 123, opposite to the side of the belt on which a performer stands), and apply a driving force thereto. In one example, the outer surface of the driving roller 130 has a high-friction coating or is formed from a high-friction material, to efficiently transmit drive to the belt 300. In one example, the roller 130 comprises a vulcanised rubber lagging as the high-friction coating or material. In one example, one or more radial grooves are formed in the surface of the driving roller 130, which receive corresponding projections formed on the inner surface of the belt 300. Accordingly, the belt 300 is tracked and remains centred on the conveyor 1000. Alternatively or additionally, the outer surface of the roller 130 may be convex, so as to form a barrel-shaped roller, so as to keep the belt 300 centred. Alternatively or additionally, adjustable end portions may be provided at the axial ends of the roller 300, to restrict axial travel thereof.

The driving roller 130 is connected to the motor 140 via a suitable power transmission assembly. For example, one end of the driving roller 130 may be connected via a chain or belt a driven axle of the motor 140. The motor 140 is arranged to be driven in either direction, and thus the belt 300 may move backwards and forwards in the direction A. In one example, the motor 140 is an AC servo motor. In some examples, the motor 140 drives a reduction gearhead (not shown), which in turn drives the chain/belt.

The motor 140 may be connectable to an external drive unit, which is powered by a power supply (e.g. mains power). In one example, the motor 140 is configured to be driven in response to a control signal received from an automation system (not shown). Accordingly, the motor 140 may be connected, via communication cables to the automation system.

Figure 4:
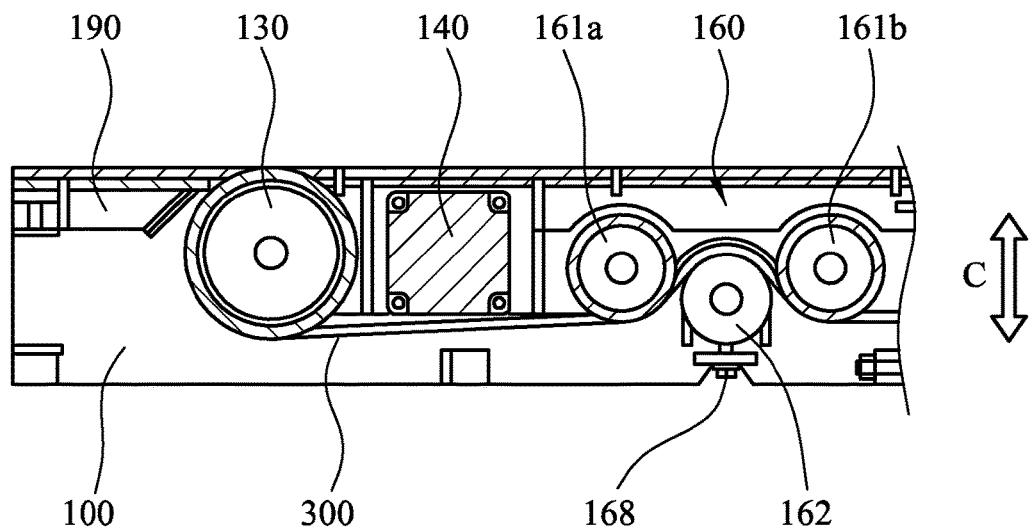
FIG. 4 is an enlarged cross-sectional view the end unit of FIGS. 2 and 3.
Figure 5:
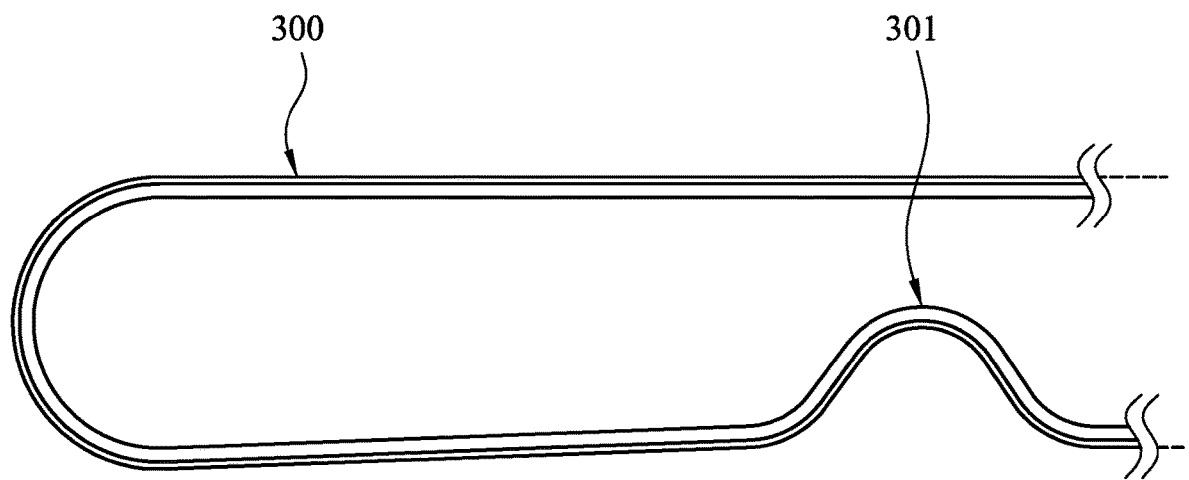
FIG. 5 is a side view of the shape of an exemplary conveyor belt passing through the end unit of FIGS. 2-4.

In one example, the end unit 100 further comprises a tensioning unit, generally indicated by reference numeral 160, for adjusting the tension of the belt 300. The tensioning unit 160 comprises a pair of fixed rollers 161, and an adjustable roller 162. The fixed rollers 161 are attached to the second frame 120, and the adjustable roller 162 is installed in the first frame 110. In addition, the adjustable roller 162 is disposed substantially between the pair of fixed rollers 161 in the direction A. Accordingly, as can be best seen in FIGS. 4 and 5, the belt 300 passes under fixed rollers 161 and over adjustable roller 162, the rollers effectively sandwiching the belt 300 and causing it to loop at point 301 over the adjustable roller 162.

The position of the adjustable roller 162 is mounted to the frame 110 in a manner that permits its position to be adjusted in a vertical direction C. For example, either end of the roller may be attached to a slidable mounting point (not shown) disposed in the frame 110, which may be moved by adjustment assembly 164, which will be described in detail below with respect to FIGS. 8A-C.

If the adjustable roller 162 is moved vertically upwards in direction C, the size of the loop formed increases, thus increasing the distance the belt 300 must travel. As the belt 300 is of a fixed length, this increases the tension of the belt 300. Similarly, if the adjustable roller 162 is moved vertically downwards, the belt 300 runs for a shorter distance, thereby decreasing the tension. In addition, due to the rollers 161/162 sandwiching the belt, it is the closing of the second frame 120 that brings the belt 300 into tension. Accordingly, the belt 300 is automatically placed in a relatively slack state upon opening the second frame 120, thereby facilitating easy attachment and detachment of the belt 300. In one example, one or more of the rollers 161/162 comprise radial grooves formed in the surface (e.g. the lagging) thereof, similarly to the driving roller 130.

Turning now to FIGS. 8A-C, an example adjustment assembly 164 can be seen in more detail. It will be appreciated that various components of the end unit 100 have been omitted in order to provide an unobstructed view of the adjustable roller 162 and adjustment assembly 164.

The adjustment assembly 164 comprises a pair of assemblies 164a, 164b arranged at the respective axial ends of the roller 162. Each assembly 164 comprises a bracket 165 which rotatably supports the end of the roller 162. Portions 166 of the bracket 165 extend into corresponding vertical slots 167, so as to allow the bracket 165 to move vertically. A set screw 168 is arranged to extend vertically upwards through the bracket 165, terminating at block 169 above the bracket 165. Accordingly, tightening of the set screw 168 causes the bracket 165 (and thus the corresponding end of the roller 162) to rise vertically, guided by slots 167. Conversely, slackening of the set screw 168 causes the bracket 165 (and thus the corresponding end of the roller 162) to fall vertically. As can be best seen in FIG. 4, the head of set screw 168 may be easily accessible by virtue of a groove formed in the underside of frame 110.

In one example, the first frame 110 and second frame 120 are respectively formed of two sections 111/112 and 121/122. Accordingly, the second sections 112/122 form an optional extension piece for the end unit 100, providing an additional length of upper support surface 123. In one example, the section 112 comprises a gravity roller 112a, which is an unpowered roller arranged to contact the outer surface of the belt 300, so as to provide additional guidance.

In one example, the end unit 100 comprises a detachable end cover plate 190. The cover plate 190 is arranged to be attached to the end unit 100 in its closed configuration, for example via coffin locks. The cover plate 190 partially covers the driving roller 130, so that a substantial portion of belt 300 that is curved around the exterior of the driving roller 130 is concealed. Accordingly, this minimises the likelihood of objects being drawn under the belt 300 and into the end unit during operation. The cover plate 190 comprises an oblique portion 191, extending obliquely down from the edge of the top surface 192 of cover plate 190 most proximate to the driving roller 130, thereby allowing the top surface 192 to be adequately supported whilst extending as close as possible to the roller 130.

It will be understood that the end unit 100 described with respect to FIGS. 2-5 forms corresponds to end unit 100a of FIG. 1, forming one end of the conveyor 1000. The opposing end unit 100b is a reflection of end unit 100a in a notional vertical plane extending in direction B.

FIGS. 6A-B and 7 show an exemplary intermediate unit 200. The intermediate unit 200 is similar to the end unit 100, but does not comprise a driving roller 130, motor 140 or tensioning unit 160. Reference numerals of intermediate unit 200 are incremented by 100 in comparison to the corresponding elements of end unit 100.

Like the end unit 100, the intermediate unit 200 comprises a first frame 210 and a second frame 220. The first frame 210 is arranged to be installed in a stage assembly, for example by being connected to the stage assembly via fasteners 210c. The second frame 220 is hingedly connected to the first frame 210 along one side edge 201 thereof, the side being parallel to the direction of motion A of the belt 300, so that the second frame 220 opens in a direction B transverse to (i.e. perpendicular to) the direction of motion A of the belt 300. This in turn exposes the opposing side 202 of the second frame 120.

Figure 7A:
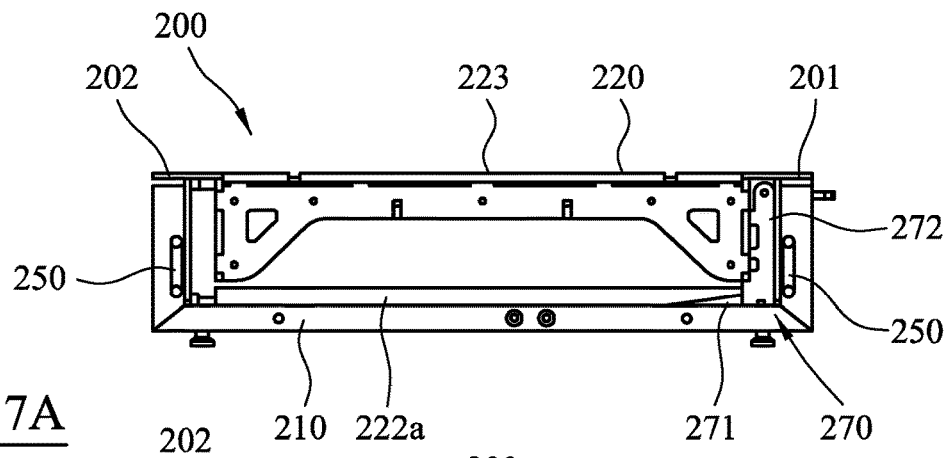
FIGS. 7A-C are side views of the intermediate unit of FIG. 6, respectively in a closed, partially open and fully open configuration.
Figure 7B:
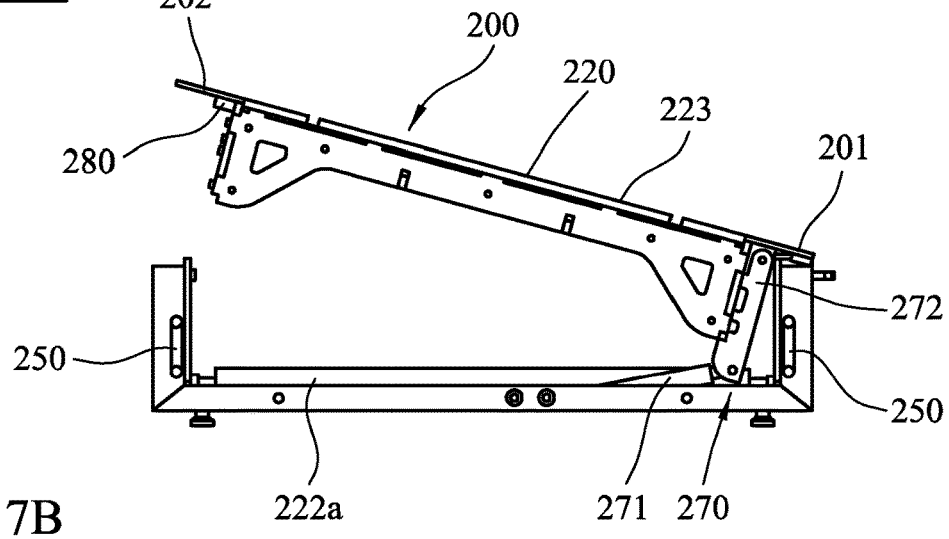
Figure 7C:
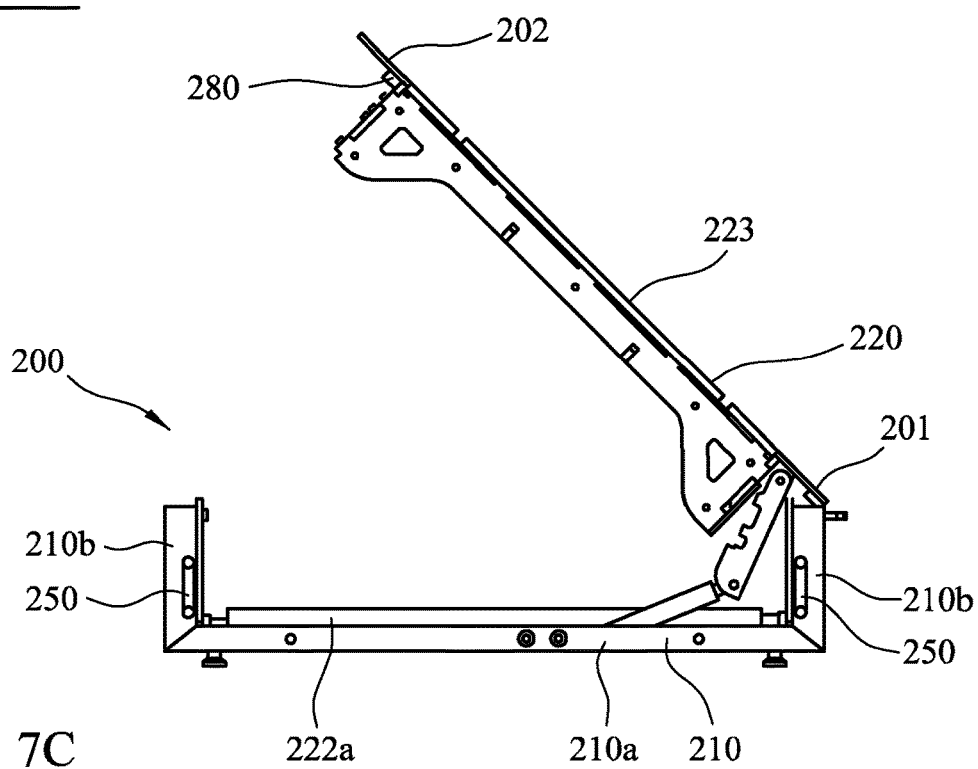

As shown in FIG. 7A-C, the second frame 220 can be moved between a fully closed configuration, partially opened configuration and fully opened configuration. Biasing mechanism 270, extendible member 271 and latching mechanism 280 operate in the same or a similar manner to biasing mechanism 170, extendible member 171 and latching mechanism 280, and therefore their operation will not be discussed again in detail.

The upper surface 223 of second frame 220 has corresponding construction to upper surface 123 of the end unit 100, and thus is arranged to act as a support surface for the belt.

In addition, the intermediate unit 200 comprises a plurality of gravity rollers 212a, disposed in the first frame 210.

The frames 110/120/210/220 of end units 100 and intermediate units 200 are formed of a lightweight material, preferably a lightweight metal, for example aluminium. Alternatively or in addition, the units 100/200 are formed by mechanical fastening. In other words, the frames 110/120/210/220 and the various components attached to the frames are attached to each other by nuts and bolts, or other suitable mechanical fasteners. Accordingly, the conveyor 1000 as a whole is not welded, save for in respect of the construction of some minor components. Accordingly, the conveyor 1000 is modular, thus facilitating easy transport, construction, repair and maintenance.

In one example, the end units 100 and intermediate units 200 are of the same size. Each of the end units 100 and intermediate units 200 are twice as long (i.e. in direction A) as they wide (i.e. in direction B), and thus have dimensions of 2 units×1 unit. The unit may correspond to around 1 m, preferably 1050 mm. Removal of the extension piece of the end unit 100 reduces its dimensions to 1 unit×1 unit, allowing for the provision of a conveyor that is an odd number of units long.

In use, a pair of end units 100, and optionally a plurality of intermediate units 200, are coupled together to provide a conveyor 1000 of desired length. The conveyor 1000 is then installed in the stage assembly, for example with the upper surfaces 123/223 of the units 100/200 flush to the surface of the stage.

Subsequently, the belt 300 is attached to the conveyor 1000. Firstly, the latching mechanisms 180/280 of the units 100/200 are disengaged. Next, the biasing mechanisms 170/270 of the units 100/200 cause the second frames 120/220 of the units 100/200 to open and move to the partially opened configuration. If desired, the second frames 120/220 may be further opened towards or to the fully opened configuration, and held in place by the biasing mechanisms 170/270 and/or the operator. In these open positions, one side 102/202 of the frames 120/220 is exposed. Accordingly, the conveyor belt 300 can be simply slid sideways (i.e. in direction B) onto the second frames 120/220, in the case of an endless belt. If the belt is a split belt, fitting is eased by virtue of the exposure of one side 102/202 of frames 120/220.

Once the conveyor belt 300 is in place, the second frames 120/220 are returned to the closed configuration, and the latching mechanisms 180/280 are engaged, thereby securing the second frames 120/220 in the closed configuration.

As the second frames 120/220 are closed, a portion of the belt 300 is retained between fixed rollers 161 and adjustable roller 162 of the tensioning unit 160, thereby tensioning the belt 300.

If the tension of the belt 300 is insufficient, the position of the adjustable roller 162 is vertically raised. If the tension of the belt 300 is too great, the position of the adjustable roller 162 is vertically lowered. Advantageously, the position of the adjustable roller 162 can be altered with the second frames 120/220 closed.

Subsequently, the motor 140 receives a control signal, and applies driving force to rotate the driving roller 170, thereby moving the belt 300.

In order to disassemble the conveyor 1000, the reverse process is followed.

Various modifications within the scope of the invention will be apparent to those skilled in the art. For example, it will be appreciated that in some examples only one of the end units may comprise a motor for driving the belt, with the other end unit comprising an unpowered roller. Similarly, in some examples only one of the end units may comprise a tensioning unit. The tensioning unit may comprise more or fewer fixed and/or movable rollers. The rollers may be replaced with wheels or other means of driving the belt.

The above-described conveyor, end units and intermediate units advantageously allow a conveyor of desired length to be quickly assembled and installed in a stage assembly. In particular, the hinged connection between the first and second frames of the end units and intermediate units permits the easy installation of the conveyor belt after the first frames are installed in the stage, by allowing the second frames to tilt to a position that exposes one side of the driving roller, fixed rollers and support surfaces 123/223.

The above-described end units further comprise a tensioning unit that advantageously tensions the belt upon closing the second frame, and releases the tension on the belt upon opening the second frame. Accordingly, attachment/detachment of the belt occurs in a state where the belt is not fully tensioned, easing the attachment/detachment. Further-more, the tensioning unit can be simply adjusted by altering the position of the adjustable roller 162.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An end unit for a conveyor for use in a stage assembly, the end unit comprising:
    a first frame installable in the stage assembly; and
    a second frame comprising a rotatable body for supporting a conveyor belt extending from the end unit to an opposing end unit of the conveyor;
    wherein the second frame is arranged to pivot with respect to the first frame, so as to open in a direction transverse to a direction of motion of the conveyor belt,
    wherein the end unit is configured to form one end of the conveyor.

2. The end unit of claim 1, wherein the rotatable body is a driving rotatable body, arranged to drive the conveyor belt.

3. The end unit of claim 2, wherein the end unit comprises a motor, arranged to drive the driving rotatable body.

4. The end unit of claim 1, wherein the rotatable body is coated with or comprises vulcanised rubber lagging.

5. The end unit of claim 1, comprising a biasing mechanism configured to bias the first frame and second frame to an open configuration.

6. The end unit of claim 1, comprising an extendible member configured to retain the second frame at a position it is moved to by a user.

7. The end unit of claim 1, wherein the second frame comprises a support surface for supporting the conveyor belt, the support surface being substantially aligned with a top of the rotatable body.

8. The end unit of claim 7, wherein the support surface comprises or is coated with ultra-high-molecular-weight polyethylene.

9. The end unit of claim 1, comprising a tensioning unit configured to increase the tension on the conveyor belt when the second frame is in a closed configuration and release the tension on the conveyor belt when the second frame is in an open configuration.

10. The end unit of claim 9, wherein the tensioning unit comprises a first tensioning rotatable body disposed in the first frame and a second tensioning rotatable body disposed in the second frame, the first and second tensioning rotatable bodies being arranged to contact opposing sides of the conveyor belt.

11. The end unit of claim 10, wherein the position of first and/or second tensioning rotatable bodies is adjustable so as to adjust the tension applied to the conveyor belt.

12. An intermediate unit for a conveyor for use in a stage assembly, the intermediate unit being configured to be disposed between a pair of end units as defined in claim 1, the intermediate unit comprising:
    a first frame installable in the stage assembly; and
    a second frame comprising a support surface for supporting a conveyor belt extending between the pair of end units;
    wherein the second frame is pivotally attached to the first frame, so as to open in a direction transverse to a direction of motion of the conveyor belt.

13. The intermediate unit of claim 12, comprising a biasing mechanism configured to bias the first frame and second frame to an open configuration.

14. The intermediate unit of claim 12, wherein the intermediate unit comprises an extendible member configured to retain the second frame at a position it is moved to by a user.

15. The intermediate unit of claim 12, wherein the support surface comprises or is coated with ultra-high-molecular-weight polyethylene.

16. A conveyor comprising a pair of end units as defined in claim 1.

17. The conveyor of claim 16, comprising one or more intermediate units disposed between the pair of end units, the one or more intermediate units each being configured to be disposed between the pair of end units and each comprising:
    a first frame installable in the stage assembly; and
    a second frame comprising a support surface for supporting a conveyor belt extending between the pair of end units;
    wherein the second frame is pivotally attached to the first frame, so as to open in a direction transverse to a direction of motion of the conveyor belt.

18. A kit of parts for a conveyor comprising a pair of end units as defined in claim 1 and an intermediate unit configured to be disposed between the pair of end units, the intermediate unit comprising:
    a first frame installable in the stage assembly; and
    a second frame comprising a support surface for supporting a conveyor belt extending between the pair of end units;
    wherein the second frame is pivotally attached to the first frame, so as to open in a direction transverse to a direction of motion of the conveyor belt.

19. The kit of parts of claim 18, comprising a conveyor belt.

20. A method of assembling a conveyor, comprising:
    installing first frames of a pair of end units as defined in claim 1, and optionally one or more intermediate units in a stage assembly, the one or more intermediate units each being configured to be disposed between the pair of end units and each comprising:
    a first frame installable in the stage assembly; and
    a second frame comprising a support surface for supporting a conveyor belt extending between the pair of end units;
    wherein the second frame is pivotally attached to the first frame, so as to open in a direction transverse to a direction of motion of the conveyor belt;

pivoting second frames of the end units, and optionally the intermediate units, so as to open the second frames in a direction transverse to a direction of a motion of a conveyor belt;
attaching the conveyor belt to the second frames; and
closing the second frames.

* * * * *